US010536592B2

(12) United States Patent
Tsuji

(10) Patent No.: US 10,536,592 B2
(45) Date of Patent: Jan. 14, 2020

(54) INFORMATION PROCESSING DEVICE FOR CHANGING LAYOUT, POSITION, OR CHARACTER STYLE OF CHARACTER STRINGS BASED ON ORIENTATION

(71) Applicant: SEIKO EPSON CORPORATION, Tokyo (JP)

(72) Inventor: Akinori Tsuji, Shiojiri (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 15/781,971

(22) PCT Filed: Nov. 18, 2016

(86) PCT No.: PCT/JP2016/084281
§ 371 (c)(1),
(2) Date: Jun. 6, 2018

(87) PCT Pub. No.: WO2017/098894
PCT Pub. Date: Jun. 15, 2017

(65) Prior Publication Data

US 2018/0359372 A1 Dec. 13, 2018

(30) Foreign Application Priority Data

Dec. 10, 2015 (JP) ................................ 2015-241600

(51) Int. Cl.
*H04N 1/387* (2006.01)
*H04N 1/00* (2006.01)
*B41J 5/30* (2006.01)

(52) U.S. Cl.
CPC .............. *H04N 1/0044* (2013.01); *B41J 5/30* (2013.01); *H04N 1/00129* (2013.01); *H04N 1/00392* (2013.01); *H04N 1/00395* (2013.01)

(58) Field of Classification Search
CPC ............ H04N 1/0044; H04N 1/00129; H04N 1/00496; B41J 5/30
USPC ....................... 358/1.11, 1.18, 3.24; 345/659
See application file for complete search history.

(56) References Cited

U.S. PATENT DOCUMENTS

2011/0115819 A1* 5/2011 Hanson ................ G06F 1/1626 345/649
2012/0206766 A1 8/2012 Suzuki
2012/0250082 A1* 10/2012 Mori .................... G06F 3/1204 358/1.15
2013/0002721 A1* 1/2013 Hirabayashi .......... G06F 17/212 345/660

(Continued)

FOREIGN PATENT DOCUMENTS

JP 2000-059474 A 2/2000
JP 2009-282814 A 12/2009

(Continued)

OTHER PUBLICATIONS

International Search Report dated Jan. 24, 2017 in PCT/JP2016/084281 with English-language translation (4 pgs.).

*Primary Examiner* — Jamares Q Washington
(74) *Attorney, Agent, or Firm* — Foley & Lardner LLP

(57) ABSTRACT

An information processing device includes a detection unit configured to detect a movement of the information processing device, and a display unit configured to display a print image in which a layout has been changed in accordance with a detected movement of the information processing device.

14 Claims, 12 Drawing Sheets

2
21 (D2)
D2a
D2h
D2t
A
A
TILT

(56) References Cited

U.S. PATENT DOCUMENTS

| | | | | |
|---|---|---|---|---|
| 2015/0215475 | A1 | 7/2015 | Furutani | |
| 2015/0242100 | A1* | 8/2015 | Sohlstrom | G06T 3/60<br>345/649 |
| 2016/0260194 | A1* | 9/2016 | Jordan | G06K 9/3208 |
| 2016/0350895 | A1* | 12/2016 | Yamaguchi | G06F 17/2863 |

FOREIGN PATENT DOCUMENTS

| | | | | | |
|---|---|---|---|---|---|
| JP | 2012-141957 | A | | 7/2012 | |
| JP | 2015-142272 | A | | 8/2015 | |
| JP | 2015153032 | A | * | 8/2015 | G06F 17/2863 |

* cited by examiner

VERTICAL/ HORIZONTAL ROTATION

VERTICAL/ HORIZONTAL ROTATION

INFORMATION PROCESSING DEVICE FOR CHANGING LAYOUT, POSITION, OR CHARACTER STYLE OF CHARACTER STRINGS BASED ON ORIENTATION

CROSS REFERENCE TO RELATED APPLICATIONS

This application is a National Phase Entry of International Appl. No. PCT/JP2016/084281, filed Nov. 18, 2016; which claims priority to Japanese Patent Application No. 2015-241600 filed on Dec. 10, 2015; the entire contents of both of which are incorporated by reference herein.

TECHNICAL FIELD

The present invention relates to an information processing device that displays a print image, a program, a display method, and a printing system.

BACKGROUND ART

A known information processing device detects the tilt of an information processing device, and in accordance with the detected tilt of the information processing device, causes a plurality of pages which form document data to be displayed so as to flow (refer to PTL 1).

CITATION LIST

Patent Literature

PTL 1: JP-A-2012-141957

SUMMARY OF INVENTION

Technical Problem

The inventor has found the following issues. A typical information processing device does not display a print image in which the layout or character style has been changed in accordance with the movement of the information processing device.

The present invention addresses the issue of providing an information processing device, a program, a display method, and a printing system which make it possible to display a print image in which the layout or character style has been changed in accordance with the movement of the information processing device.

Solution to Problem

An information processing device of the present invention includes a detection unit configured to detect a movement of the information processing device, and a display unit configured to display a print image in which a layout has been changed in accordance with a detected movement of the information processing device.

A display method of the present invention includes an information processing device detecting a movement of the information processing device, and the information processing device displaying a print image in which a layout has been changed in accordance with a detected movement of the information processing device.

With this configuration, when the information processing device is moved, the movement of the information processing device is detected by the information processing device.

Then, a print image is displayed in which the layout has been changed in accordance with the detected movement of the information processing device. Accordingly, this configuration makes it possible to display a print image in which the layout has been changed in accordance with the detected movement of the information processing device.

The above-described information processing device may further include an image data creation unit configured to create image data in which the layout has been changed in accordance with the detected movement of the information processing device.

With this configuration, when the information processing device is moved, the movement of the information processing device is detected. Then, image data is created in which the layout has been changed in accordance with the detected movement of the information processing device. Accordingly, this configuration makes it possible to create image data in which the layout has been changed in accordance with the movement of the information processing device.

In such case, the display unit may display, as the layout, the print image in which a layout of a character string has been changed.

With this configuration, a print image in which the layout of a character has been changed in accordance with the movement of the information processing device is displayed.

In such case, the display unit may display, as the layout, a print image in which a position of a character string on a printing medium has been changed.

With this configuration, a print image in which the position of the character string on the printing medium has been changed in accordance with the detected movement of the information processing device is displayed.

In such case, the display unit, in a process of the position of the character string being changed, may display on the print image a state in which an image of the character string is moving relative to an image of the printing medium.

With this configuration, a state is displayed in which the image of the character string is moving relative to the image of the printing medium in accordance with the movement of the information processing device.

In such case, the detection unit may detect a degree of the movement of the information processing device, and for the display unit to display, at a speed commensurate with a detected degree of the movement of the information processing device, the state in which the image of the character string is moving relative to the image of the printing medium.

With this configuration, when the information processing device is moved, the degree of movement of the information processing device is detected. Then, a state is displayed in which the image of the character string is moving at a speed commensurate with the detected degree of movement of the information processing device.

A program of the present invention causes a computer to function as the above-described information processing device.

A printing system of the present invention includes an information processing device and a printing device, the information processing device including a detection unit configured to detect a movement of the information processing device, a display unit configured to display a print image in which a layout has been changed in accordance with a detected movement of the information processing device, an image data creation unit configured to create image data in which the layout has been changed in accordance with the detected movement of the information processing device, and an image data transmission unit configured to transmit the created image data to the printing device, and the printing device includes a printing unit configured to perform printing based on the received image data.

This configuration provides a printed object in which a layout has been changed in accordance with the movement of the information processing device.

Another information processing device of the present invention includes a detection unit configured to detect a movement of the information processing device, and a display unit configured to display a print image in which a character style has been changed in accordance with a detected movement of the information processing device.

Another display method of the present invention includes an information processing device detecting a movement of the information processing device, and the information processing device displaying a print image in which a character style has been changed in accordance with a detected movement of the information processing device.

With this configuration, when the information processing device is moved, the movement of the information processing device is detected. Then, a print image is displayed in which the character style has been changed in accordance with the detected movement of the information processing device. Accordingly, this configuration makes it possible to display a print image in which the character style has been changed in accordance with the detected movement of the information processing device.

In the aforementioned information processing device, the display unit may display, as the character style, the print image in which at least one among whether the character style is a mirror character, whether the character style is italic, and a direction of the character is changed.

With this configuration, the movement of the information display device displays a print image in which at least one among whether the character style is a mirror character, whether the character style is italic, and a direction of the character is changed.

Another program of the present invention causes a computer to function as the above-described information processing device.

Another printing system of the present invention includes an information processing device and a printing device, the information processing device including a detection unit configured to detect a movement of the information processing device, a display unit configured to display a print image in which a character style has been changed in accordance with a detected movement of the information processing device, an image data creation unit configured to create image data in which the character style has been changed in accordance with the detected movement of the information processing device, and an image data transmission unit configured to transmit the created image data to the printing device, and the printing device includes an image data reception unit configured to receive the image data and a printing unit configured to perform printing based on the received image data.

This configuration provides a printed object in which a character style has been changed in accordance with the movement of the information processing device.

DESCRIPTION OF EMBODIMENTS

Some exemplary embodiments of the invention are described below with reference to the accompanying drawings.

Figure 1:
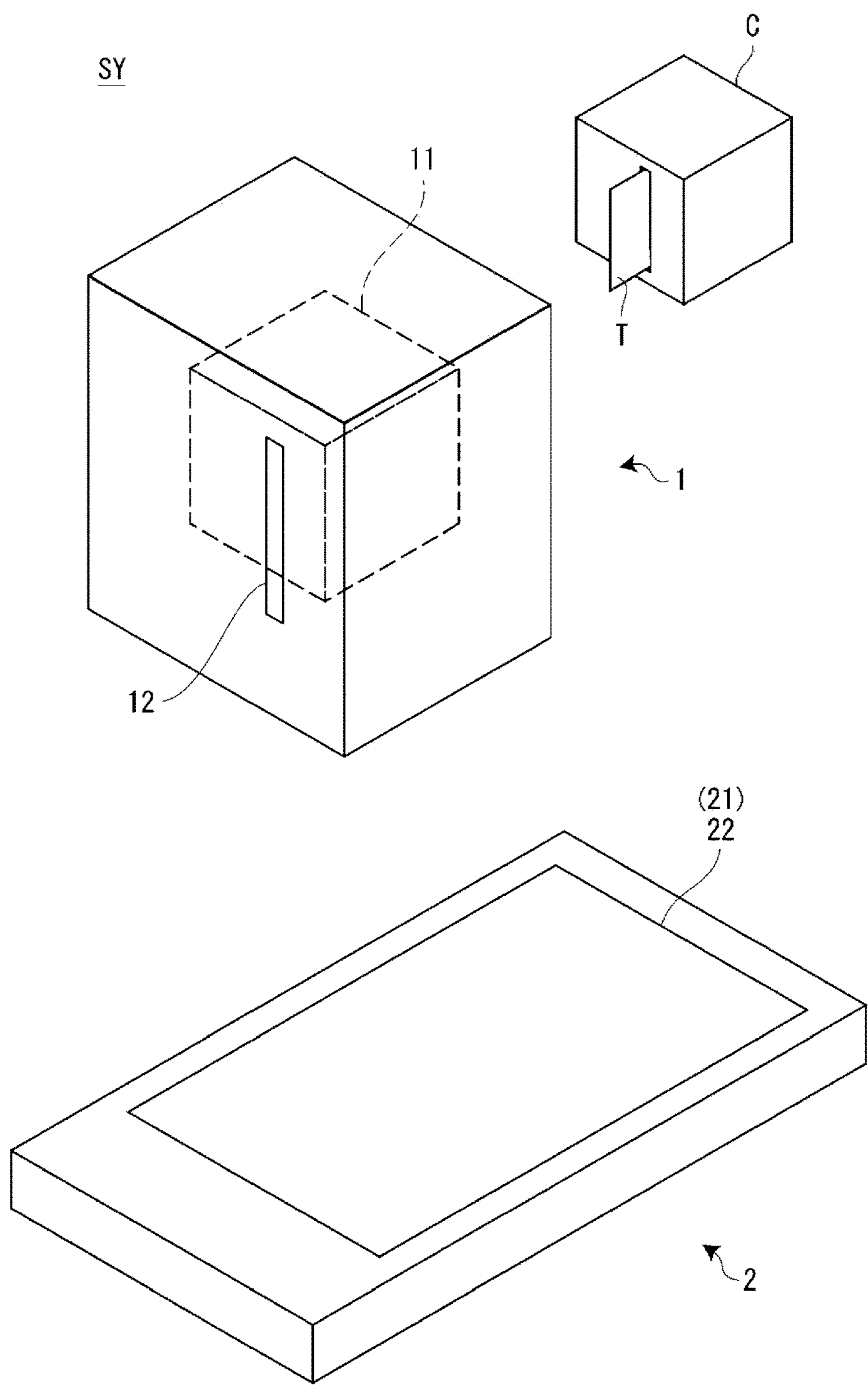
FIG. 1 is a view illustrating a printing system according to one exemplary embodiment of the present invention.

A printing system SY will be described based on FIG. 1. The printing system SY includes a tape printing apparatus 1 and a smart device 2. The tape printing apparatus 1 and smart device 2 are connected wirelessly so as to be able to communicate with each other.

The tape printing apparatus 1 includes a cartridge mounting part 11 and a tape discharge port 12. The tape printing apparatus 1 performs printing on tape T of a tape cartridge C mounted on the cartridge mounting part 11 based on image data received from the smart device 2. The printed portion of the tape T discharged from the tape discharge port 12 is cut off to form a tape piece U (refer to FIG. 8 to FIG. 11). The obtained tape piece U is attached to a location as a label.

The smart device 2 can be a smartphone, tablet terminal, or the like, for example. The smart device 2 has an installed application program corresponding to the tape printing apparatus 1 (hereinafter, "corresponding application"). The smart device 2 includes a touch panel 22. The touch panel 22 detects the input of a character, an editing operation, or the like by a user. A "character" is a concept including a letter, symbol, pictograph, and the like. The smart device 2 creates image data, and transmits the created image data to the tape printing apparatus 1 based on the input or editing operation etc. detected by the touch panel 22.

Figure 2:
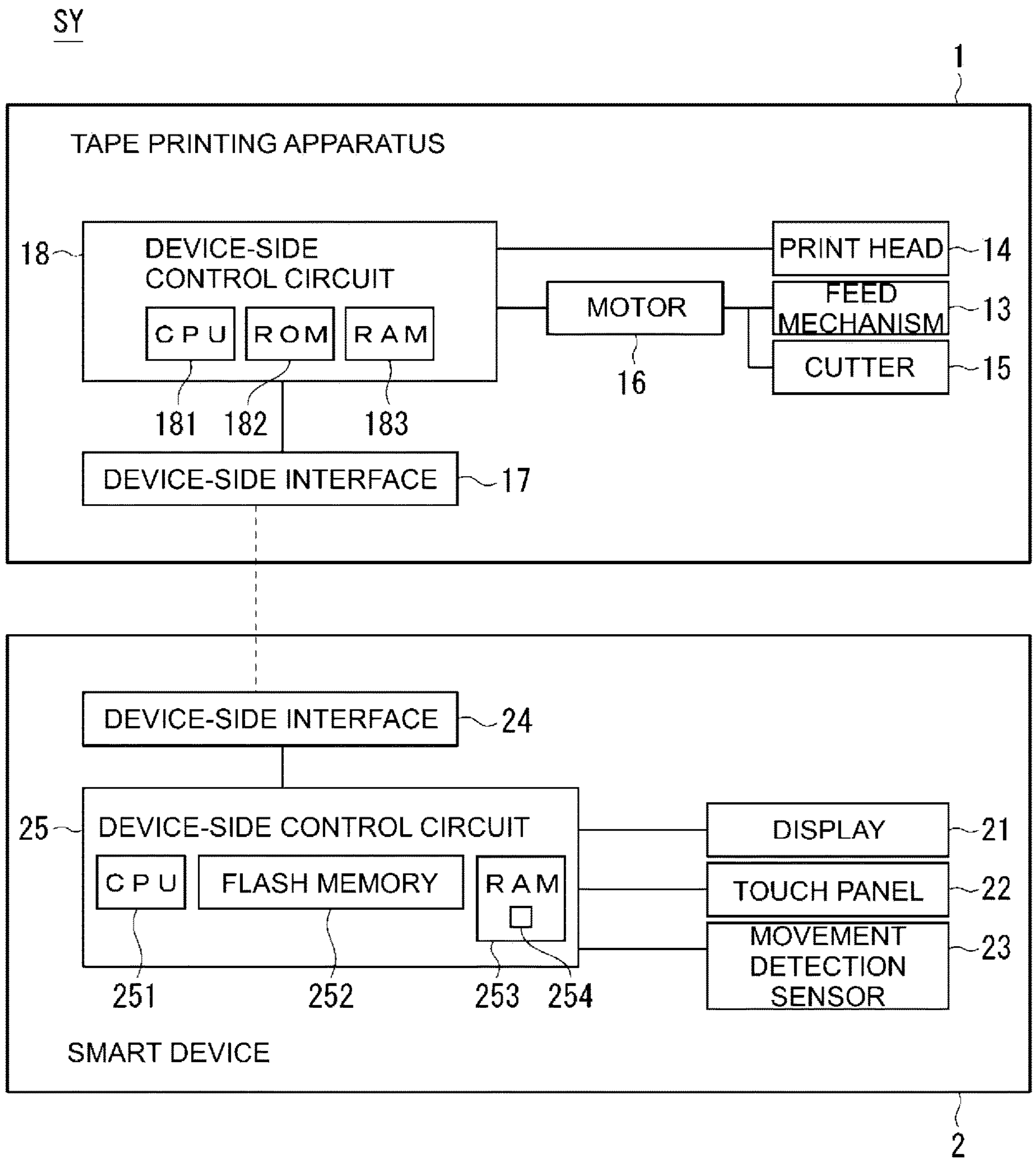
FIG. 2 is a block diagram of a printing system.

The tape printing apparatus 1 and smart device 2 will be described based on FIG. 2. The tape printing apparatus 1 includes a feed mechanism 13, a print head 14, a cutter 15, a motor 16, a device-side interface 17, and a device-side control circuit 18.

The feed mechanism 13 causes a platen roller (not illustrated) stored in the tape cartridge C to rotate while the tape cartridge C is mounted in the cartridge mounting part 11. This feeds the tape T and ink ribbon (not illustrated) stored in the tape cartridge C.

The print head 14 performs heat generation driving based on the received image data while the tape T and ink ribbon are held with the platen roller. This transfers the ink of the ink ribbon to the tape T and prints a character on the tape T.

The cutter 15 cuts the tape T in the width direction of the tape T. The motor 16 serves as the drive source of the feed mechanism 13 and cutter 15.

The device-side interface 17 transmits and receives various types of commands, various types of data, etc. with a device-side interface 24, which will be described later.

The device-side control circuit 18 controls the respective parts of the tape printing apparatus 1. The device-side control circuit 18 includes a CPU 181 (Central Processing Unit), a ROM 182 (Read Only Memory), and a RAM 183 (Random Access Memory). The CPU 181 uses the RAM 183 to execute the various types of programs stored in the ROM 182, thus executing various types of processes.

The smart device 2 includes a display 21, a touch panel 22, a movement detection sensor 23, the device-side interface 24, and a device-side control circuit 25.

The display 21 displays various types of screens. The display 21 is a color liquid crystal display, for example. Furthermore, the touch panel 22 is provided overlapping the display 21 and detects a touch operation of a user.

The movement detection sensor 23 detects the movement of the smart device 2. The movement detection sensor 23 may be an acceleration sensor or a gyroscope, for example.

The device-side interface 24 transmits and receives various types of commands, various types of data, etc. with the device-side interface 17 described above.

The device-side control circuit 25 controls the respective parts of the smart device 2. The device-side control circuit 25 includes a CPU 251, flash memory 252, and RAM 253. The CPU 251 uses the RAM 253 to execute various types of programs (including the corresponding application) stored in the flash memory 252.

The RAM 253 includes a character string storage unit 254. The character string storage unit 254 stores character string data. The character string data includes a plurality of character data, layout data, mirror character data, and vertical/horizontal data. The respective character data is made of code data of characters input from the touch panel 22 by the user and font data indicating the font size, modification content (for example, italic), etc. of the characters. The layout data defines the layout of the character strings. The layout of the character strings has five types prepared: "left alignment," "center alignment," "right alignment," "upper alignment," and "lower alignment," for example. The types of layout of the character strings is not limited to five types and may be three types or nine types, for example. The mirror character data defines whether to make the character string a mirror character. The vertical/horizontal data defines the orientation of the character string (vertical writing direction or horizontal writing direction).

Figure 7:
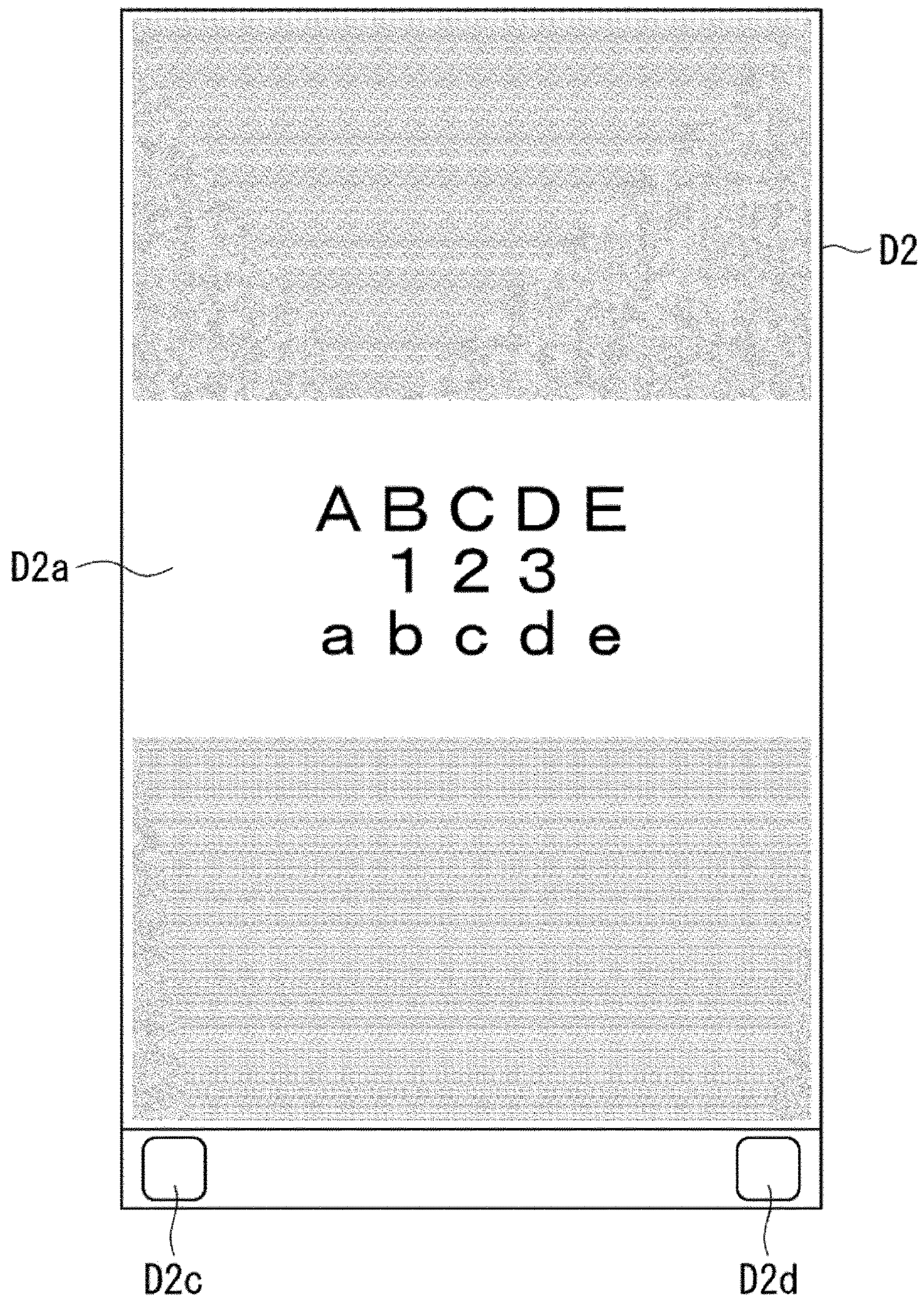
FIG. 7 is a view illustrating an editing screen.

The device-side control circuit 25 creates image data based on the character string data stored in the character string storage unit 254. The display 21 displays a print image D2*a* (refer to FIG. 7) based on the created image data. The created image data is transmitted to the tape printing apparatus 1, and the tape printing apparatus 1 drives the print head 14 based on the received image data and performs printing on the tape T.

Figure 3:
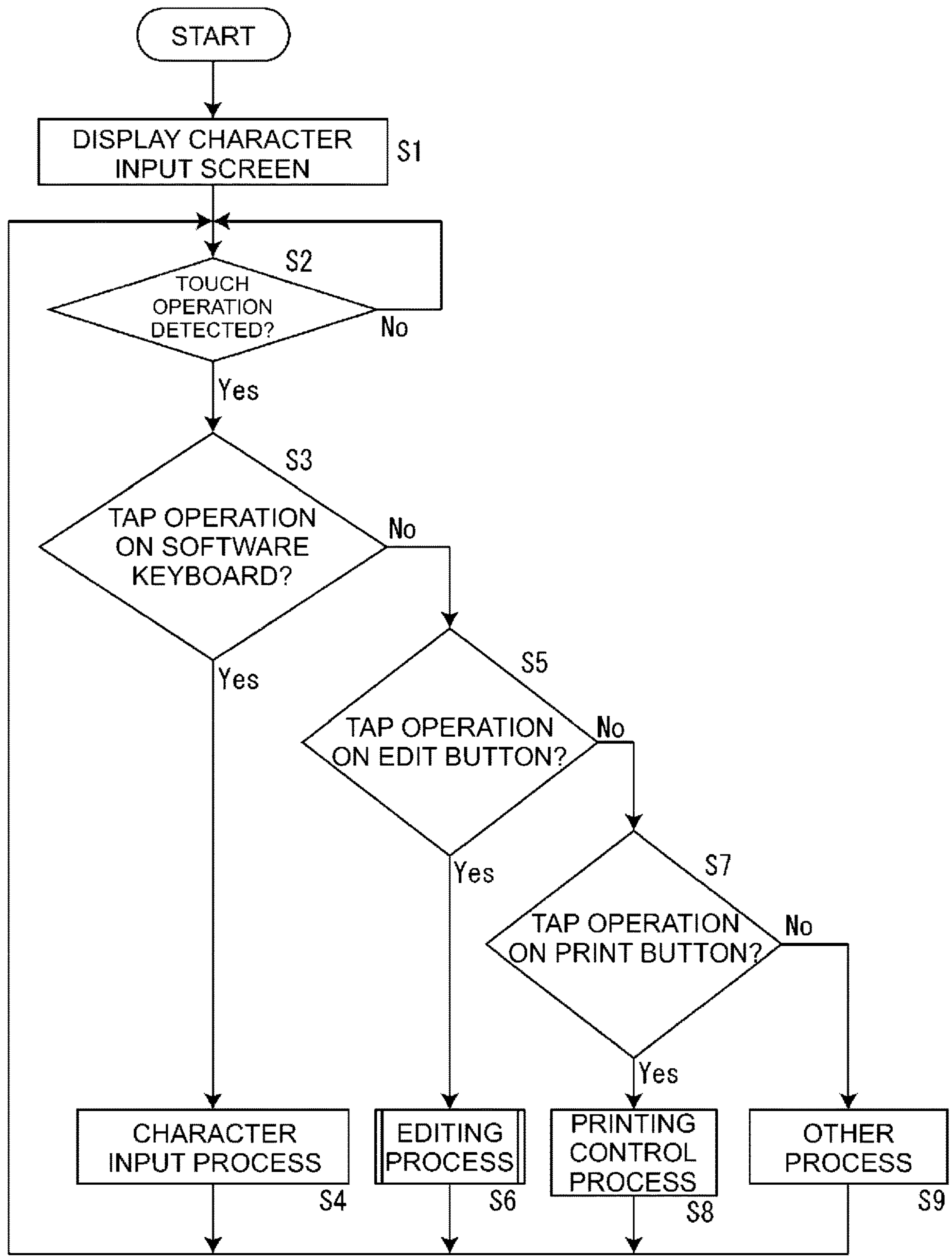
FIG. 3 is a flowchart illustrating the flow of a process executed by a smart device.
Figure 4:
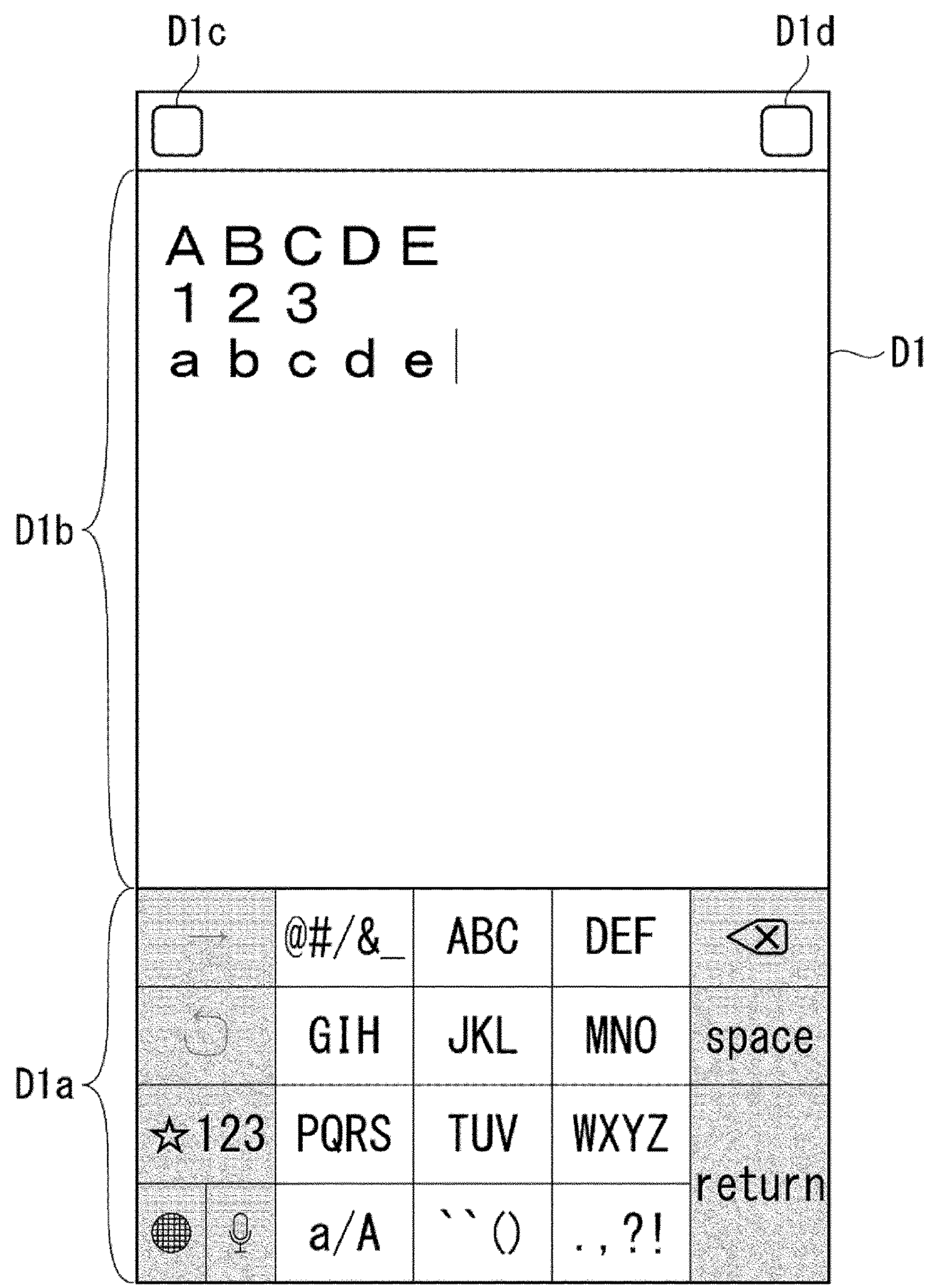
FIG. 4 is a view illustrating a character input screen.

The processing procedure of the device-side control circuit 25 will be described based on FIG. 3. The device-side control circuit 25, after the corresponding application has been started, causes the display 21 to display a character input screen D1 in step S1. The character input screen D1 displays a software keyboard D1*a*, a character input column D1*b*, a print button D1*c*, and an edit button D1*d* (refer to FIG. 4).

The device-side control circuit 25, proceeding to step S2, determines whether a touch operation corresponding to the character input screen D1 has been detected by the touch panel 22. If the device-side control circuit 25 has determined that a touch operation has been detected (S2; Yes), the device-side control circuit proceeds to step S3. If the device-side control circuit 25 has determined that a touch operation has not been detected (S2; No), the device-side control circuit repeats step S2 and waits for a touch operation on the character input screen D1.

The device-side control circuit 25, in step S3, determines whether the touch operation detected in step S2 is a tap operation on the software keyboard D1*a*. If the device-side control circuit 25 has determined that the touch operation is a tap operation on the software keyboard D1*a* (S3; Yes), the device-side control circuit proceeds to step S4. If the device-side control circuit 25 has determined that the touch operation is not a tap operation on the software keyboard D1*a* (S3; No), the device-side control circuit proceeds to step S5.

The device-side control circuit 25 performs a character input process in step S4. In the character input process, the device-side control circuit 25 stores, in the character string storage unit 254, code data corresponding to the key on which the tap operation has been performed on the software keyboard D1*a*. The input character is displayed in the character input column D1*b* based on the code data stored in the character string storage unit 254. When the character input process is finished, the device-side control circuit 25 returns to step S2 and waits for a touch operation on the character input screen D1.

The device-side control circuit 25, in step S5, determines whether the touch operation detected in step S2 is a tap operation on the edit button D1*d*. If the device-side control circuit 25 has determined that the touch operation is a tap operation on the edit button D1*d* (S5; Yes), the device-side control circuit proceeds to step S6. If the device-side control circuit 25 has determined that the touch operation is not a tap operation on the edit button D1*d* (S5; No), the device-side control circuit proceeds to step S7.

The device-side control circuit 25, in step S6, performs an editing process, which is described later. When the editing process is finished, the device-side control circuit 25 returns to step S2 and waits for a touch operation on the character input screen D1.

The device-side control circuit 25, in step S7, determines whether the touch operation detected in step S2 is a tap operation on the print button D1*c*. If the device-side control circuit 25 has determined that the touch operation is a tap operation on the print button D1*c* (S7; Yes), the device-side control circuit proceeds to step S8. If the device-side control circuit 25 has determined that the touch operation is not a tap operation on the print button D1*c* (S7; No), the device-side control circuit proceeds to step SS9.

The device-side control circuit 25, in step S8, performs a printing control process. In the printing control process, the device-side control circuit 25 creates image data based on the character string data, and transmits the created image data to the tape printing apparatus 1. When the printing control process is finished, the device-side control circuit 25 returns to step S2 and waits for a touch operation on the character input screen D1.

The device-side control circuit 25, in step S9, performs another process. When the other process is finished, the device-side control circuit 25 returns to step S2 and waits for a touch operation on the character input screen D1.

Figure 5:
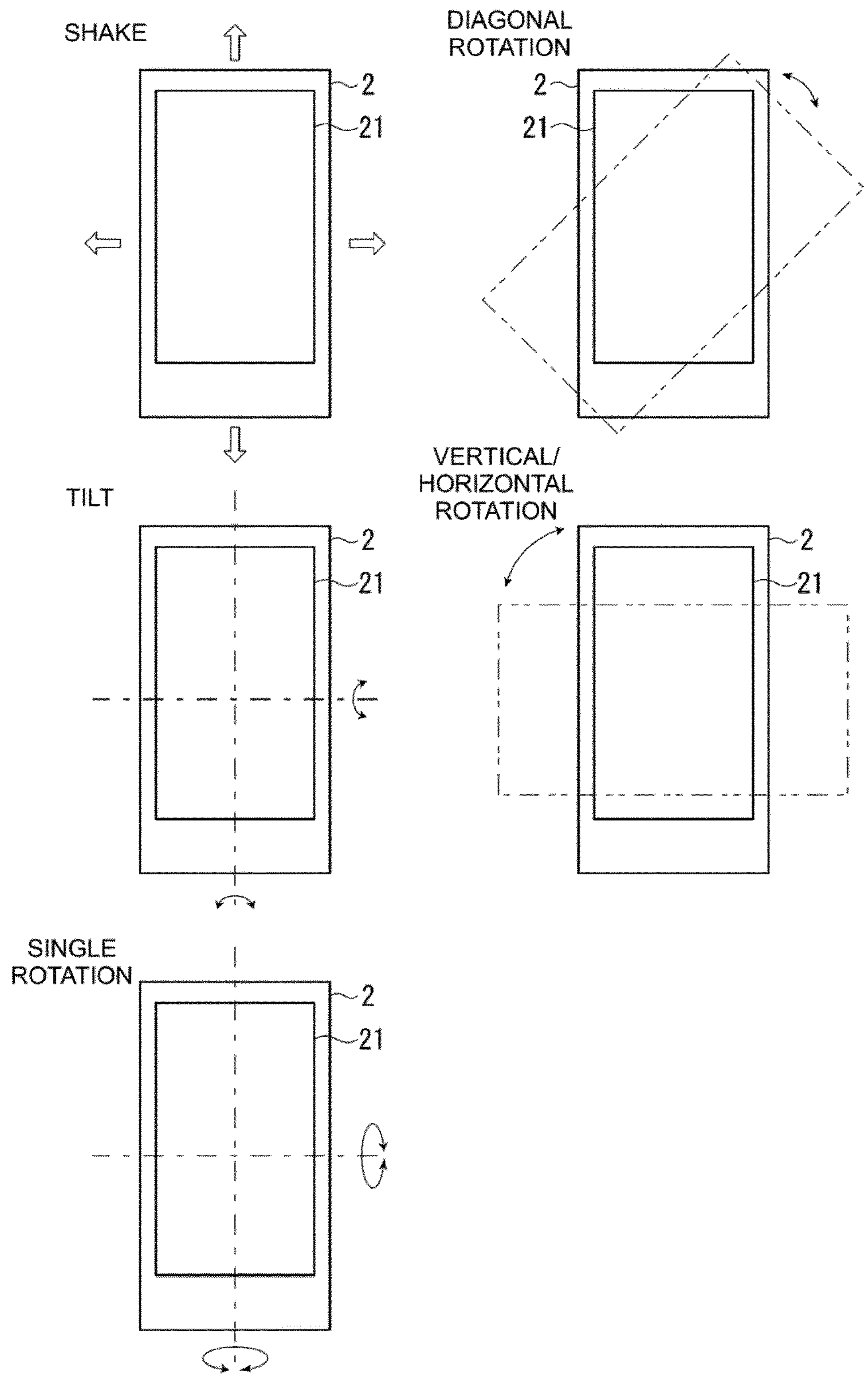
FIG. 5 is a view for explaining the movement of a smart device.

The types of movement of the smart device 2 will be described with reference to FIG. 5. The device-side control circuit 25 determines whether the movement of the smart device 2 detected by the movement detection sensor 23 corresponds to anyone of a shake, tilt, single rotation, diagonal rotation, and vertical/horizontal rotation based on a detection result (a change in acceleration or angular velocity, for example) of the movement detection sensor 23. In the explanation below, as the direction of the smart device 2, while the display 21 is facing up, the side that is close as seen from the user is referred to as the "front," the side that is far is the "back," the left side is the "left," and the right side is the "right."

Among the movements of the smart device 2, the "shake" refers to the smart device 2 moving to any one of the front, rear, left, and right. The "tilt" refers to the smart device 2 tilting to any one of the front, rear, left, and right. For example, the smart device 2 tilting toward the front means that the smart device 2 transitions to an attitude where the display 21 is facing diagonally front from an attitude where the display 21 is facing upward. "One rotation" means that the smart device 2 has one rotation to any one of the front, back, left, and right. "Diagonal rotation" means that the smart device 2, in a plane substantially parallel to the display 21, rotates to a diagonal attitude from an attitude during normal usage, or namely, from a vertical attitude. "Vertical/horizontal rotation" means that the smart device 2, in a plane substantially parallel to the display 21, rotates substantially 90° between a vertical attitude and a horizontal attitude.

Figure 6:
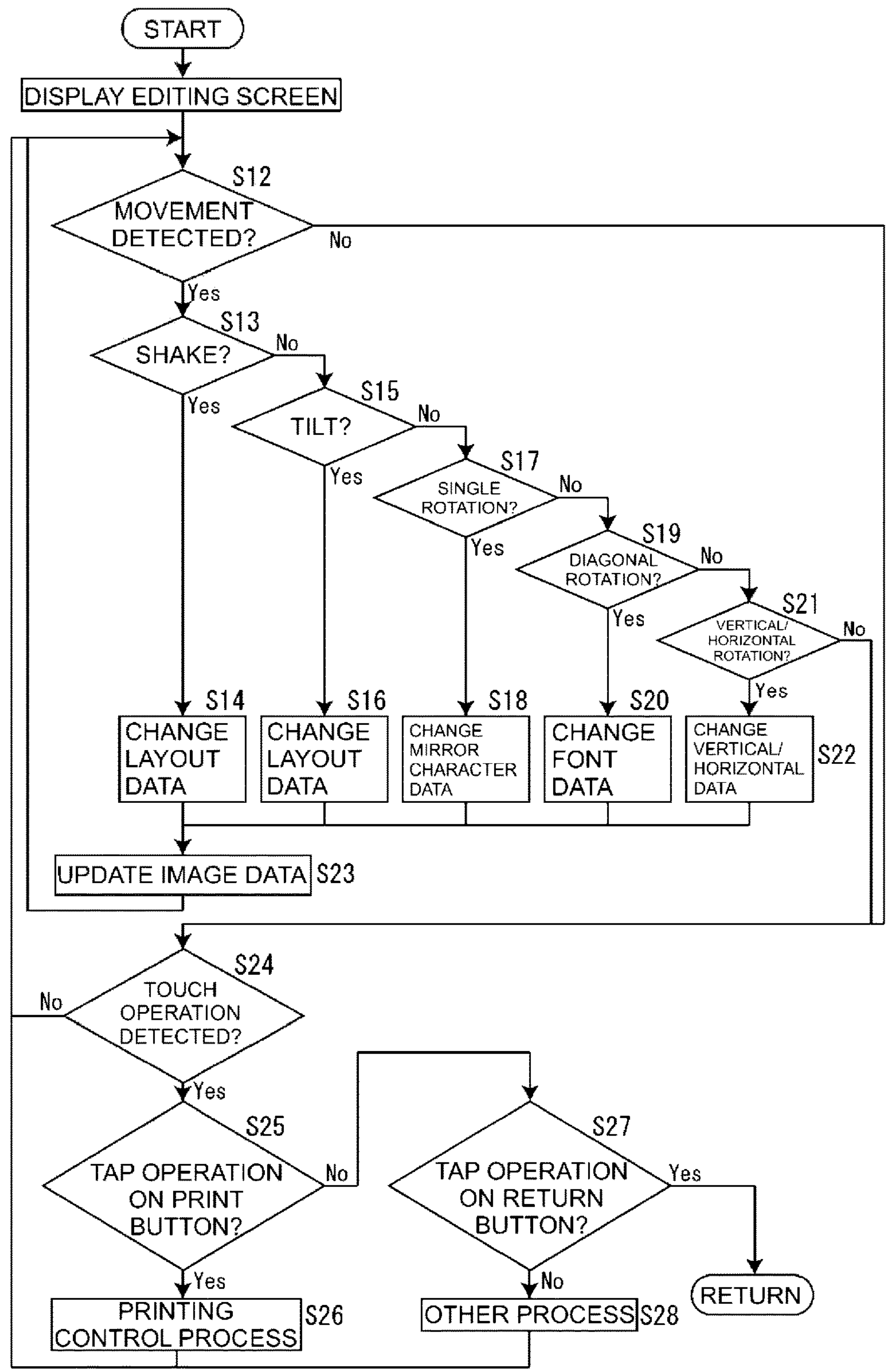
FIG. 6 is a flowchart illustrating the flow of an editing process executed by a smart device.

The flow of the editing process of step S6 in the flowchart of FIG. 3 will be described based on FIG. 6. The device-side control circuit 25, in the editing process, changes the layout or character style. This layout includes the layout of the character string. The style of the character includes whether the character is a mirror character, whether the character is italic, and the direction of the character (vertical writing direction or horizontal writing direction).

The device-side control circuit 25, in step S11, causes the display 21 to display the editing screen D2. The print image D2*a*, print button D2*c*, and return button D2*d* are displayed on the editing screen D2 (refer to FIG. 7).

Proceeding to step S12, the device-side control circuit 25 determines whether the movement of the smart device 2 has been detected by the movement detection sensor 23 while the editing screen D2 is displayed on the display 21. If the device-side control circuit 25 has determined that a movement of the smart device 2 has been detected (S12; Yes), the device-side control circuit proceeds to step S13. If the device-side control circuit 25 has determined that a movement of the smart device 2 has not been detected (S12; No), the device-side control circuit proceeds to step S24.

The device-side control circuit 25, in step S13, determines whether the movement of the smart device 2 detected in step S12 is a shake. If the device-side control circuit 25 has determined that the detected movement of the smart device 2 is a shake (S13; Yes), the device-side control circuit proceeds to step S14, and if the device-side control circuit 25 determines that the detected movement of the smart device 2 is not a shake (S13; No), the device-side control circuit proceeds to step S15.

The device-side control circuit 25, in step S14, changes the layout data based on the detected movement direction of the smart device 2, and then the device-side control circuit proceeds to step S23.

The device-side control circuit 25, in step S15, determines whether the movement of the smart device 2 detected in step S12 is a tilt. If the device-side control circuit 25 has determined that the detected movement of the smart device 2 is a tilt (S15; Yes), the device-side control circuit proceeds to step S16, and if the device-side control circuit 25 determines that the detected movement of the smart device 2 is not a tilt (S15; No), the device-side control circuit proceeds to step S17.

The device-side control circuit 25, in step S16, changes the layout data based on the detected tilt direction of the smart device 2, and then the device-side control circuit proceeds to step S23.

The device-side control circuit 25, in step S17, determines whether the movement of the smart device 2 detected in step S12 is a single rotation. If the device-side control circuit 25 has determined that the detected movement of the smart device 2 is a single rotation (S17; Yes), the device-side control circuit proceeds to step S18, and if the device-side control circuit 25 determines that the detected movement of the smart device 2 is not a single rotation (S17; No), the device-side control circuit proceeds to step S19.

The device-side control circuit 25, in step S18, changes the mirror character data, and then the device-side control circuit proceeds to step S23.

The device-side control circuit 25, in step S19, determines whether the movement of the smart device 2 detected in step S12 is a diagonal rotation. If the device-side control circuit 25 has determined that the detected movement of the smart device 2 is a diagonal rotation (S19; Yes), the device-side control circuit proceeds to step S20, and if the device-side control circuit 25 determines that the detected movement of the smart device 2 is not a diagonal rotation (S19; No), the device-side control circuit proceeds to step S21.

The device-side control circuit 25, in step S20, changes the font data, and then the device-side control circuit proceeds to step S23.

The device-side control circuit 25, in step S21, determines whether the detected movement of the smart device 2 is a vertical/horizontal rotation. If the device-side control circuit 25 has determined that the detected movement of the smart device 2 is a vertical/horizontal rotation (S21; Yes), the device-side control circuit proceeds to step S22, and if the device-side control circuit 25 determines that the detected movement of the smart device 2 is not a vertical/horizontal rotation (S21; No), the device-side control circuit proceeds to step S24.

The device-side control circuit 25, in step S22, changes the vertical/horizontal data, and then the device-side control circuit proceeds to step S23.

The device-side control circuit 25, in step S23, updates the image data based on the character string data including the changed layout data, mirror character data, font data, or vertical/horizontal data. Due to this, when the layout data has changed, the image data D2*a* in which the layout has been changed is displayed on the display 21 (refer to FIG. 8). When the mirror character data has changed, the print image D2*a* that has been changed from a normal font to a mirror character, or the print image D2*a* that has been changed from a mirror character to a normal font, is displayed on the display 21 (refer to FIG. 9). When the font data has changed, the print image D2*a* that has been changed from a normal font to italic, or the print image D2*a* that has been changed from italic to a normal font, is displayed on the display 21 (refer to FIG. 10). When the vertical/horizontal data has changed, the print image D2*a* that has been changed from a horizontal writing direction to a vertical writing direction, or the print image D2*a* that has been changed from a vertical writing direction to a horizontal writing direction, is displayed on the display 21 (refer to FIG. 11).

The device-side control circuit 25, in step S24, determines whether a touch operation on the editing screen D2 has been detected by the touch panel 22. If the device-side control circuit 25 has determined that a touch operation has been detected (S24; Yes), the device-side control circuit proceeds to step S25. If the device-side control circuit 25 has determined that a touch operation has not been detected (S24; No), the device-side control circuit returns to step S12.

The device-side control circuit 25, in step S25, determines whether the touch operation detected in step S24 is a tap operation on the print button D2*c*. If the device-side control circuit 25 has determined that the touch operation is a tap operation on the print button D2*c* (S25; Yes), the device-side control circuit proceeds to step S26. If the device-side control circuit 25 has determined that the touch operation is not a tap operation on the print button D2*c* (S25; No), the device-side control circuit proceeds to step S27.

The device-side control circuit 25, in step S26, performs a printing control process. In the printing control process, the device-side control circuit 25 creates image data based on the character string data, and transmits the created image data to the tape printing apparatus 1. When the printing control process is finished, the device-side control circuit 25 returns to step S12.

The device-side control circuit 25, in step S27, determines whether the touch operation detected in step S24 is a tap operation on the return button D2*d*. When the device-side control circuit 25 determines that the touch operation is a tap operation on the return button D2*d* (S27; Yes), the device-side control circuit returns to step S2 in the flowchart in FIG. 3 and waits for a touch operation on the character input screen D1. If the device-side control circuit 25 has determined that the touch operation is not a tap operation on the return button D2*d* (S27; No), the device-side control circuit proceeds to step S28.

The device-side control circuit 25, in step S28, performs another process. When the other process is finished, the device-side control circuit 25 returns to step S12.

Figure 8:
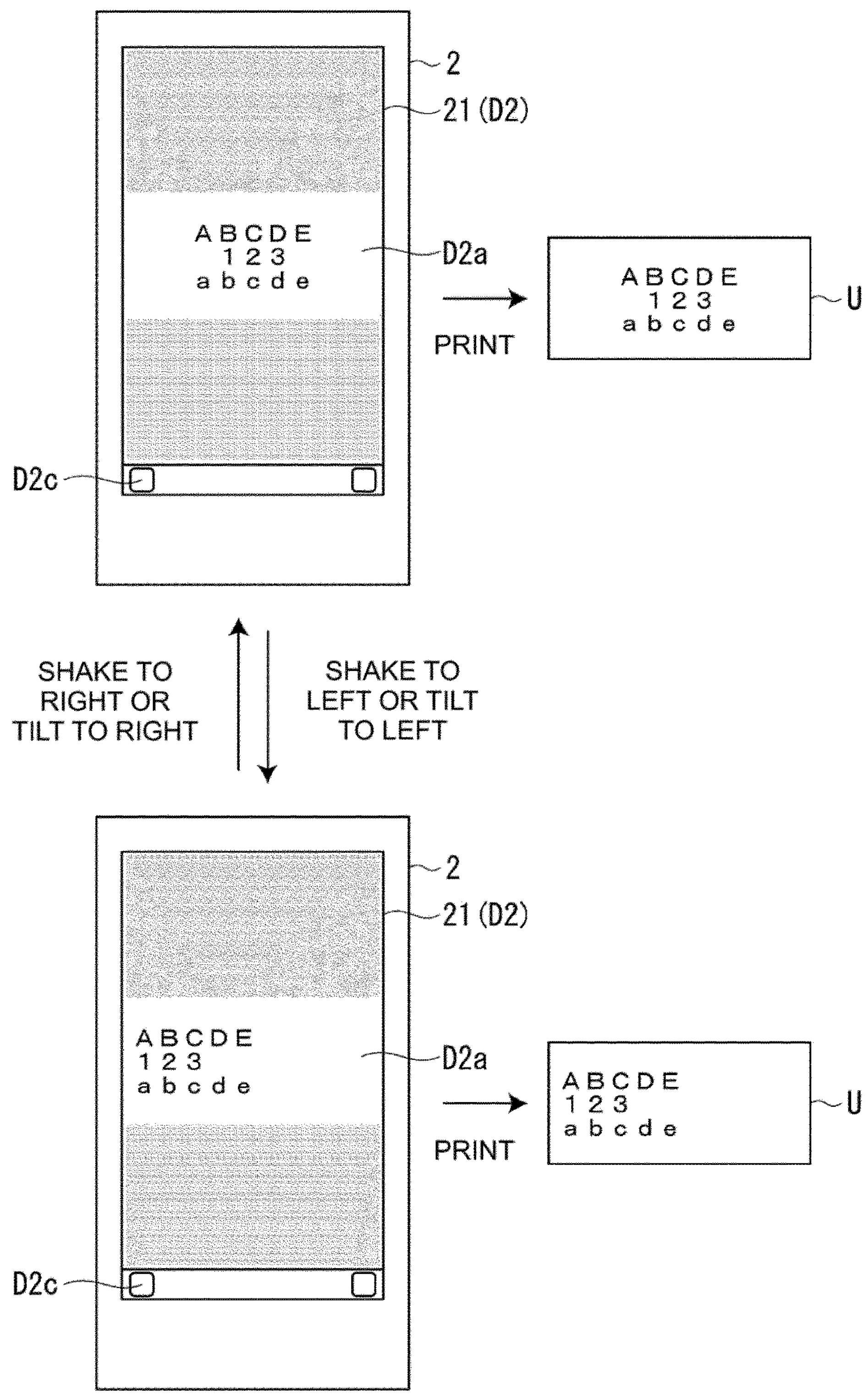
FIG. 8 is a view for explaining a change in the layout of a character string in accordance with the shake or tilt of a smart device.

The change in the layout of the character string in accordance with the shake or tilt of the smart device 2 will be described based on FIG. 8. If the smart device 2 is shaken to the left or tilted to the left while a print image D2*a* having a layout of "center alignment" is displayed on the editing screen D2, then the display 21 displays a print image D2*a* in which the layout has been changed to "left alignment." Tapping the print button D2*c* provides a tape piece U in which the layout has been changed to "left alignment." After this, if the smart device 2 is shaken to the right or tilted to the right, then the display 21 displays a print image D2*a* in which the layout has been changed to "center alignment." Tapping the print button D2*c* provides a tape piece U in which the layout has been changed to "center alignment." Here, a case was described in which the smart device 2 was shaken to the left or tilted to the left while the layout was "center alignment" and after this was shaken to the right or tilted to the right, but the actions are similar when the smart device 2 is shaken or tilted in other directions.

Figure 9:
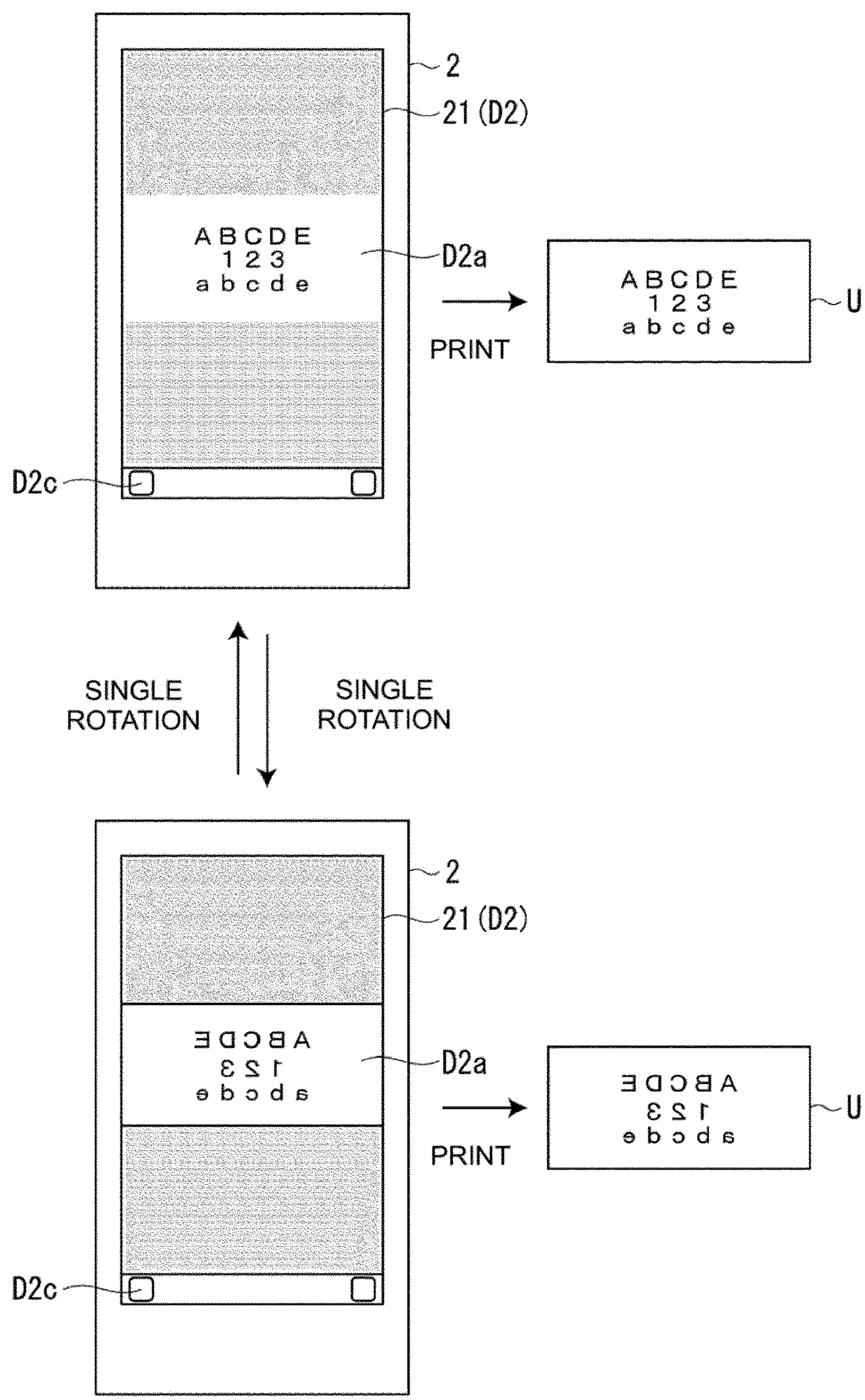
FIG. 9 is a view for explaining the change of a mirror character and normal font in accordance with a single rotation of the smart device.

The change of a mirror character and normal font in accordance with a single rotation of the smart device 2 will be described based on FIG. 9. If the smart device 2 has a single rotation while a print image D2*a* that is a normal font, or namely, not a mirror character, is displayed on the editing screen D2, then the display 21 displays a print image D2*a* that has been changed to a mirror character. Tapping the print button D2*c* provides a tape piece U changed to a mirror character. After this, if the smart device 2 has another single rotation, then the display 21 displays a print image D2*a* that has been changed to a normal font. Tapping the print button D2*c* provides a tape piece U changed to a normal font.

Figure 10:
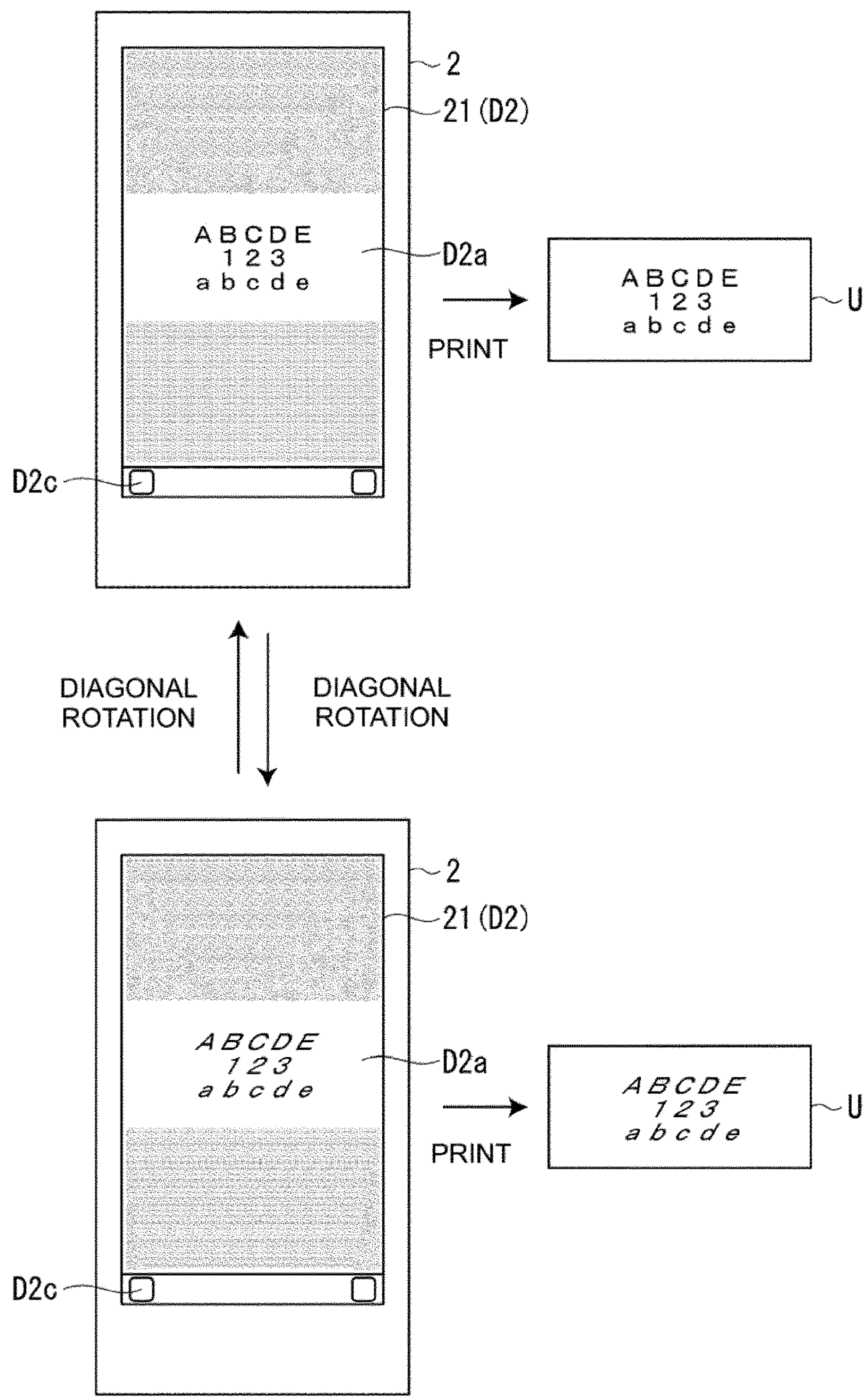
FIG. 10 is a view for explaining the change of italic and normal font in accordance with the diagonal rotation of a smart device.

The change of italic and normal font in accordance with a diagonal rotation of the smart device 2 will be described based on FIG. 10. In a case where the smart device 2 has a diagonal rotation while a print image D2*a* that is a normal font, or namely, not italic, is displayed on the editing screen D2, then the display 21 displays a print image D2*a* that has been changed to italic. Tapping the print button D2*c* provides a tape piece U changed to italic. After this, in a case where the smart device 2 has another diagonal rotation, then the display 21 displays a print image D2*a* that has been changed to a normal font. Tapping the print button D2*c* provides a tape piece U changed to a normal font. The tilt direction when changing from a normal font to italic may be the same or opposite direction to the tilt direction when changing from italic to a normal font.

Figure 11:
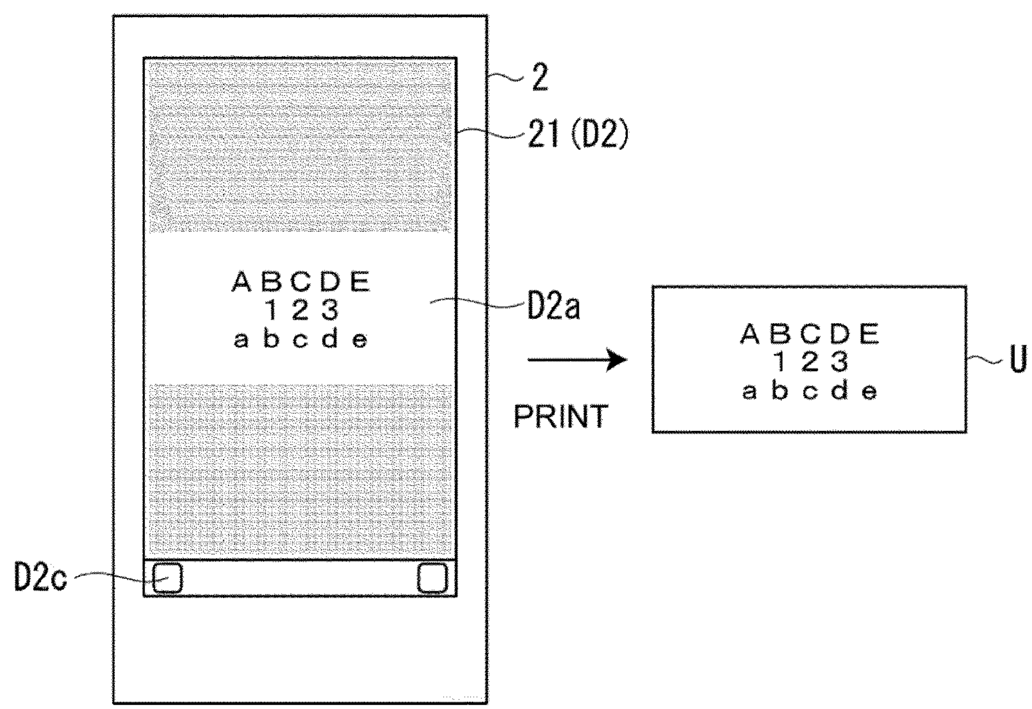
FIG. 11 is a view for explaining a change in the orientation of a character in accordance with the vertical/horizontal rotation of a smart device.
Figure 11:
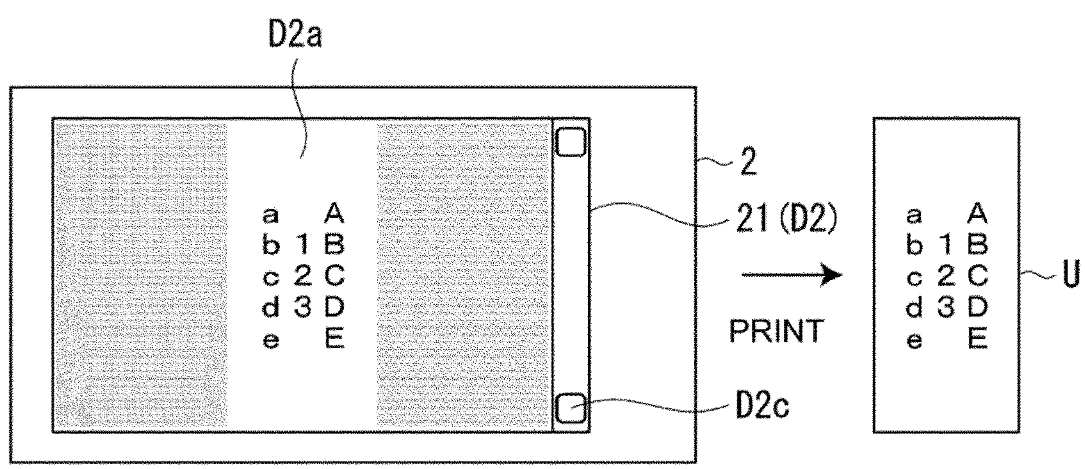

The change in the orientation of a character in accordance with the vertical/horizontal rotation of a smart device 2 will be described based on FIG. 11. While the smart device 2 has a vertical attitude and a print image D2*a* with a horizontal writing direction is displayed on the editing screen D2, in a case where the smart device 2 has a vertical/horizontal rotation and becomes a horizontal attitude, then the display 21 displays a print image D2*a* that has been changed to a vertical writing direction. Tapping the print button D2*c* provides a tape piece U changed to a vertical writing direction. After this, in a case where the smart device 2 has another vertical/horizontal rotation and returns to a vertical writing direction, then the display 21 displays a print image D2*a* that has been changed to a horizontal writing direction. Tapping the print button D2*c* provides a tape piece U changed to a horizontal writing direction.

As described above, the smart device 2 of this exemplary embodiment includes the movement detection sensor 23 and the display 21. The movement detection sensor 23 detects the movement of the smart device 2. The display 21 displays a print image D2*a* in which the layout or character style has been changed in accordance with the detected movement of the smart device 2.

With this configuration, when the smart device 2 is moved by the user, the movement of the smart device 2 is detected. Then, a print image D2*a* is displayed in which the layout or character style has been changed in accordance with the detected movement of the smart device 2. Accordingly, this configuration makes it possible to display a print image D2*a* in which the layout or character style has been changed in accordance with the detected movement of the smart device 2.

Furthermore, the smart device 2 of this exemplary embodiment further includes the device-side control circuit 25, which creates image data in which the layout or character style has been changed in accordance with the detected movement of the smart device 2.

With this configuration, when the smart device 2 is moved by the user, the movement of the smart device 2 is detected. Then, image data is created in which the layout or character style has been changed in accordance with the detected movement of the smart device 2. Accordingly, this configuration makes it possible to create image data in which the layout or character style has been changed in accordance with the movement of the smart device 2. Due to this, it is possible for the user to more intuitively change the layout or character style as compared to if a touch operation were performed on various types of buttons displayed on the character input screen D1 or the like to change the layout or character style.

The print head 14 is one example of a "printing unit." The device-side interface 17 is one example of an "image data reception unit." The display 21 is one example of a "display unit." The movement detection sensor 23 is one example of a "detection unit." The device-side interface 24 is one example of an "image data transmission unit." The device-side control circuit 25 is one example of an "image data creation unit." The tape T is one example of a "printing medium." The present invention is not limited to the exemplary embodiment described above, and various configurations are possible without departing from the scope of the present invention. For example, this exemplary embodiment can be changed to aspects such as described below.

Figure 12:
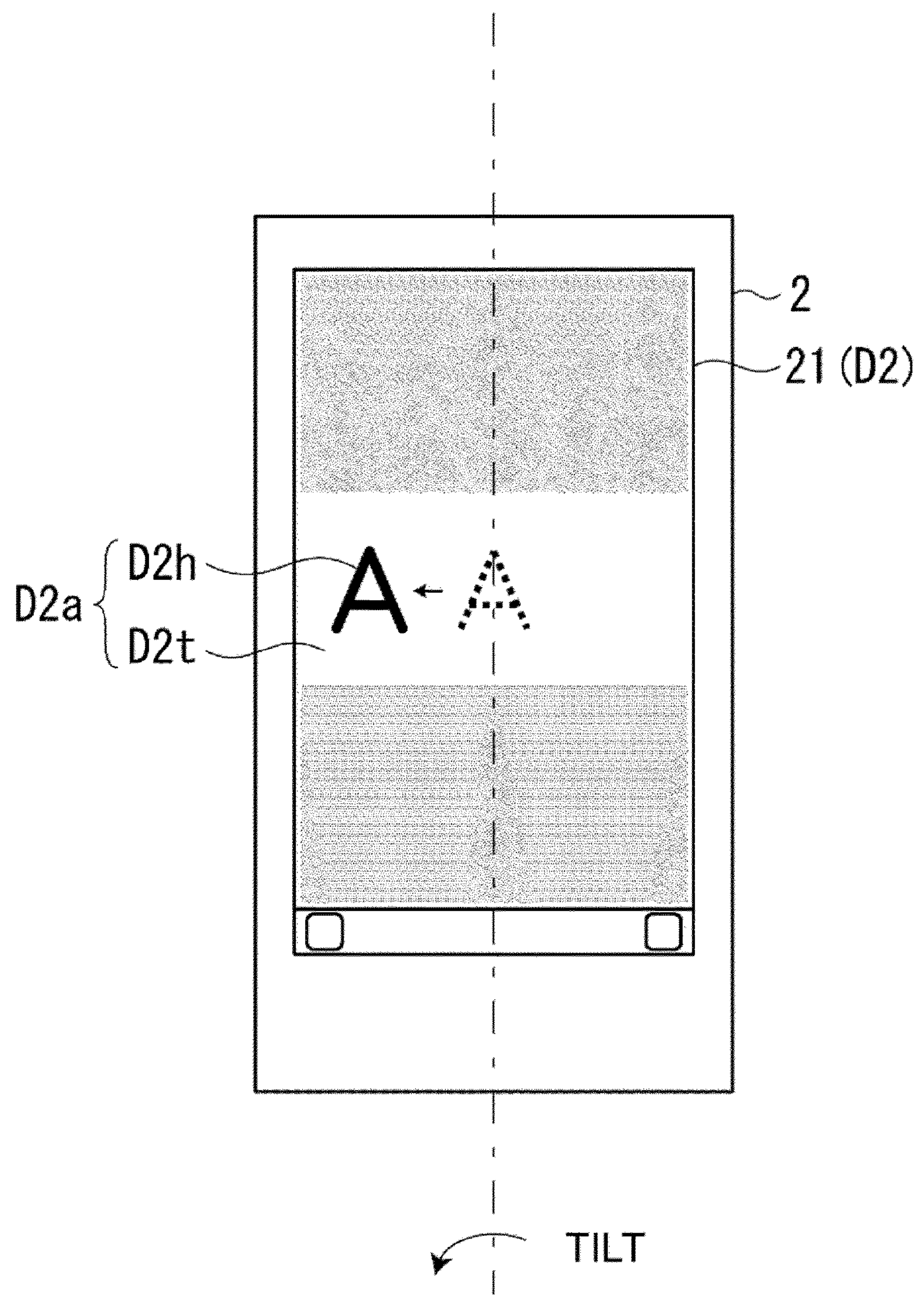
FIG. 12 is a view illustrating a character image moving relative to a tape image in accordance with the tilt of a smart device.

The display 21 is not limited to the layout of character strings as the layout, and may display a print image D2*a* in which the position of the character string on the tape T has been changed, for example. Moreover, as illustrated in FIG. 12, the display 21, in the process of the position of the character string being changed, may display, as a moving image, a state in which a character image D2*h* moves (in a tilt direction, for example) relative to a tape image D2*t* in accordance with the movement of the smart device 2. The character image D2*h* is an image of a character in the print image D2*a*. The tape image D2*t* is an image of the tape T in the print image D2*a*. Due to this, the user can tilt the display 21 to cause the character image D2*h* to move in the direction of the tilt, similar in sensation to tilting a board in order to cause a ball on top of the board to move in the direction of the tilt. In such case, the display-side control circuit 25 may change position coordinate data of the character image D2*h* instead of layout data in accordance with the detection of the movement of the smart device 2.

In addition, in such case, the display 21 may display a state in which the character image D2*h* moves relative to the tape image D2*t* at a speed commensurate with the degree of tilt (for example, tilt angle or angular velocity) of the smart device 2. In other words, when the smart device 2 is tilted to a large degree or tilted quickly, the display 21 displays a state in which the character image D2*h* moves at a high speed relative to the tape image D2*t*. When the smart device 2 is tilted to a small degree or tilted slowly, the display 21 displays a state in which the character image D2*h* moves at a low speed relative to the tape image D2*t*. In this configuration, similar to being able to adjust the movement speed of a ball on top of a board by adjusting the tilt angle of the board, the user can adjust the degree of tilt of the smart device 2 in order to adjust the movement speed of the character image D2*h* relative to the tape image D2*t*.

The movement of the smart device 2 for changing the layout or character style is not limited to the examples of movements given in this exemplary embodiment. For example, the movements for changing mirror character setting is not limited to a single rotation of the smart device 2, and may be a movement of the smart device 2 in the up-down direction or the like. It is desirable to set the movement of the smart device 2 such that the user is able to change the layout or character style as intuitively as possible.

Among the plurality of character strings, the display 21 may display a print image D2*a* in which the layout or character style has been changed for only a character string selected by a tap operation or the like on the editing screen D2. Furthermore, among the plurality of characters, the display 21 may display a print image D2*a* in which the layout or character style has been changed for only a pre-selected character selected by a tap operation or the like on the editing screen D2.

The information processing device may be a notebook computer including a movement detection sensor 23 instead of the smart device 2, for example.

The printing system SY may include, as the printing device, a printing device that performs printing on a single sheet of paper or a printing device that performs printing on a sheet of roll paper, etc., instead of the tape printing apparatus 1, for example.

The present invention can also be provided as a program that causes the information processing device to function as the smart device 2 in the present exemplary embodiment (for example, the corresponding application described above), and a storage medium (CD-ROM, flash memory, etc.) in which the program is stored.

The invention claimed is:

1. An information processing device, comprising:

a detection unit configured to detect a movement of the information processing device;

a control circuit configured to perform a character input process which creates a character string, and to perform an editing process which creates image data for a print image in which one or both of a layout and a position of the character string has been changed in accordance with a detected movement of the information processing device; and a display unit configured to display the print image in which the layout and/or the position of the character string has been changed in accordance with the detected movement of the information processing device;

wherein the layout of the position of the character string comprises an alignment of the character string within the print image that the control circuit determines in accordance with the detected movement of the information processing device; and wherein the position of the character string is determined by position coordinate data that the control circuit determines in accordance with the detected movement of the information processing device.

2. The information processing device according to claim 1, wherein:

the editing process is configured to create the image data for the print image in which the layout of the character string has been changed in accordance with the detected movement of the information processing device; and the display unit is configured to display the print image in which the layout of the character string has been changed in accordance with the detected movement of the information processing device.

3. The information processing device according to claim 1, wherein:

the editing process is configured to create the image data for the print image in which the position of the character string has been changed in accordance with the detected movement of the information processing device; and the display unit is configured to display the print image in which the position of the character string has been changed in accordance with the detected movement of the information processing device.

4. The information processing device according to claim 3, wherein the control circuit is configured to control the display unit such that, in a process of the position of the character string being changed, the display unit displays on the print image an image of the character string that is moving relative to an image of the printing medium.

5. The information processing device according to claim 4, wherein the detection unit is configured to detect a degree of the movement of the information processing device, and the control unit is configured to control the display unit to display the image of the character string that is moving relative to the image of the printing medium at a speed commensurate with a detected degree of the movement of the information processing device.

6. A non-transient computer-readable medium containing instructions, which when executed by the control circuit, cause the control circuit to perform said character input process and said editing process according to claim 1.

7. A display method for an information processing device, comprising:

creating, by a character input process executed by a control circuit of the information processing device, a character string;

detecting, by a detection unit of the information processing device, a movement of the information processing device; and creating, by a character input process executed by the control circuit of the information processing device, image data for a print image in which a layout and/or a position of the character string has been changed in accordance with a detected movement of the information processing device; and displaying, by a display unit of the information processing device, the print image in which the layout and/or the position of the character string has been changed in accordance with the detected movement of the information processing device.

8. A printing system comprising:

an information processing device; and a printing device;

wherein the information processing device comprises:

a detection unit configured to detect a movement of the information processing device, a control circuit configured to perform a character input process which creates a character string, and to perform an editing process which creates image data for a print image in which a layout and/or the position of a character string has been changed in accordance with a detected movement of the information processing device, a display unit configured to display the print image in which the layout and/or the position of the character string has been changed in accordance with the detected movement of the information processing device, and an image data transmission unit configured to transmit the created image data to the printing device; and wherein the printing device comprises:

an image data reception unit configured to receive the image data, and a printing unit configured to perform printing based on the received image data.

9. An information processing device, comprising:

a detection unit configured to detect a movement of the information processing device;

a control circuit configured to perform a character input process which creates a character string, and to perform an editing process which creates image data for a print image in which a character style of a character string has been changed in accordance with a detected movement of the information processing device; and a display unit configured to display the print image in which the character style has been changed in accordance with the detected movement of the information processing device;

wherein the change in the character style is a change to one or both of (i) a mirror character style and (ii) an italic character style.

10. A non-transient computer-readable medium containing instructions, which when executed by the control circuit, cause the control circuit to perform said character input process and said editing process according to claim 9.

11. A display method, comprising:

creating, by a character input process of a control circuit of the information processing device, a character string;

detecting, by a detection unit of the information processing device, a movement of the information processing device;

creating, by a control circuit of the information processing device, image data for a print image in which a character style of the character string has been changed in accordance with a detected movement of the information processing device; and displaying, by a display unit of the information processing device, the print image in which the character style has been changed in accordance with the detected movement of the information processing device;

wherein the change in the character style is a change to one or more of (i) a mirror character style and (ii) an italic character style.

12. A printing system comprising:

an information processing device; and a printing device;

wherein the information processing device comprises:

a detection unit configured to detect a movement of the information processing device, a control circuit configured to perform a character input process which creates a character string, and to perform an editing process which creates image data for a print image in which a character style of a character string has been changed in accordance with a detected movement of the information processing device, a display unit configured to display the print image in which the character style has been changed in accordance with the detected movement of the information processing device, and an image data transmission unit configured to transmit the created image data to the printing device, wherein the change in the character style is a change to one or more of (i) a mirror character style and (ii) an italic character style; and wherein the printing device comprises:

an image data reception unit configured to receive the image data, and a printing unit configured to perform printing based on a received image data.

13. The printing system according to claim 8, wherein the printing unit comprises a tape printing apparatus.

14. The printing system according to claim 12, wherein the printing unit comprises a tape printing apparatus.

* * * * *